US005366167A

United States Patent [19]

McCarthy

[11] Patent Number: 5,366,167

[45] Date of Patent: Nov. 22, 1994

[54] FULL WIDTH STATIONARY SCALPER FOR ROLL MILL GRINDERS

[75] Inventor: Bradley J. McCarthy, Waterloo, Iowa

[73] Assignee: Roskamp-Champion, Waterloo, Iowa

[21] Appl. No.: 77,264

[22] Filed: Jun. 17, 1993

[51] Int. Cl.$^5$ .......... B65G 69/12

[52] U.S. Cl. .......... 241/81; 209/675

[58] Field of Search .......... 241/24, 91; 209/660, 209/675–680

[56] References Cited

U.S. PATENT DOCUMENTS 1,051,267 1/1913 Rombauer .......... 209/675 X 1,476,880 12/1923 Earle .......... 241/81

4,350,307 9/1982 Olson .

FOREIGN PATENT DOCUMENTS 2936198 3/1981 Germany .......... 209/675

*Primary Examiner*—Douglas D. Watts

*Attorney, Agent, or Firm*—Robert F. Palermo

[57] ABSTRACT

A stationary scalper removes coarse trash, from feed material entering a roll mill grinder, by diverting the trash across an adjustable inclined grate to a trash discharge chute. The grate is fitted with parallel grate bars extending in the direction of inclination for easy trash transport. A flow director spreads the feed material over the full length of the grate below the feed inlet and an adjustable rigid door defines a gap above the grate which controls the flow rate of trash toward the discharge chute. By controlling flow rate, the efficiency of trash separation may be maximized for a given production rate.

4 Claims, 2 Drawing Sheets

FULL WIDTH STATIONARY SCALPER FOR ROLL MILL GRINDERS

BACKGROUND OF THE INVENTION

This invention relates generally to trash removers, or scalpers, used alone or applied to hammermills, crackers, or to roll mill grinders and more particularly to trash removers for roll mill grinders used for grinding feed materials.

Roll mill grinders are employed to crush corn and other feed materials during processing of such feeds. The opposing rolls of the mills are set at a gap appropriate for the material being ground and the grind coarseness desired.

In operation of such roll mills, it is unavoidable that occasionally trash will be introduced along with the feed. This trash may consist of stones, corn cobs, plant stalks, husks or other large hard materials which may disrupt the roll gap allowing unground feed material to pass through the gap and possibly damaging the rolls or other parts of the roll grinder. This degrades the quality of the ground feed material and causes grinder downtime needed for clearing blockages and for making repairs.

Screens have been used to remove coarse matter in feed material, but such screens are subject to frequent blockage resulting in a significant loss of capacity and associated cost penalties when the mesh size is small enough to effectively remove such coarse matter or trash. The problem described has, thus, persisted.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by a scalper for removal of trash from feed material, prior to entry of said feed material into a roll mill grinder, including a scalper housing having a top feed material inlet, a bottom product discharge outlet, and a trash discharge chute; and a grate located with said housing below the feed material inlet and adjustably inclined downwardly therefrom above said discharge outlet toward the trash discharge chute, the grate having uniformly spaced parallel grate bars extending from the inlet toward the trash discharge chute.

The foregoing and other aspects will become apparent from the following detailed description of the invention when considered in conjunction with the accompanying drawing figures.

DETAILED DESCRIPTION

Figure 1:
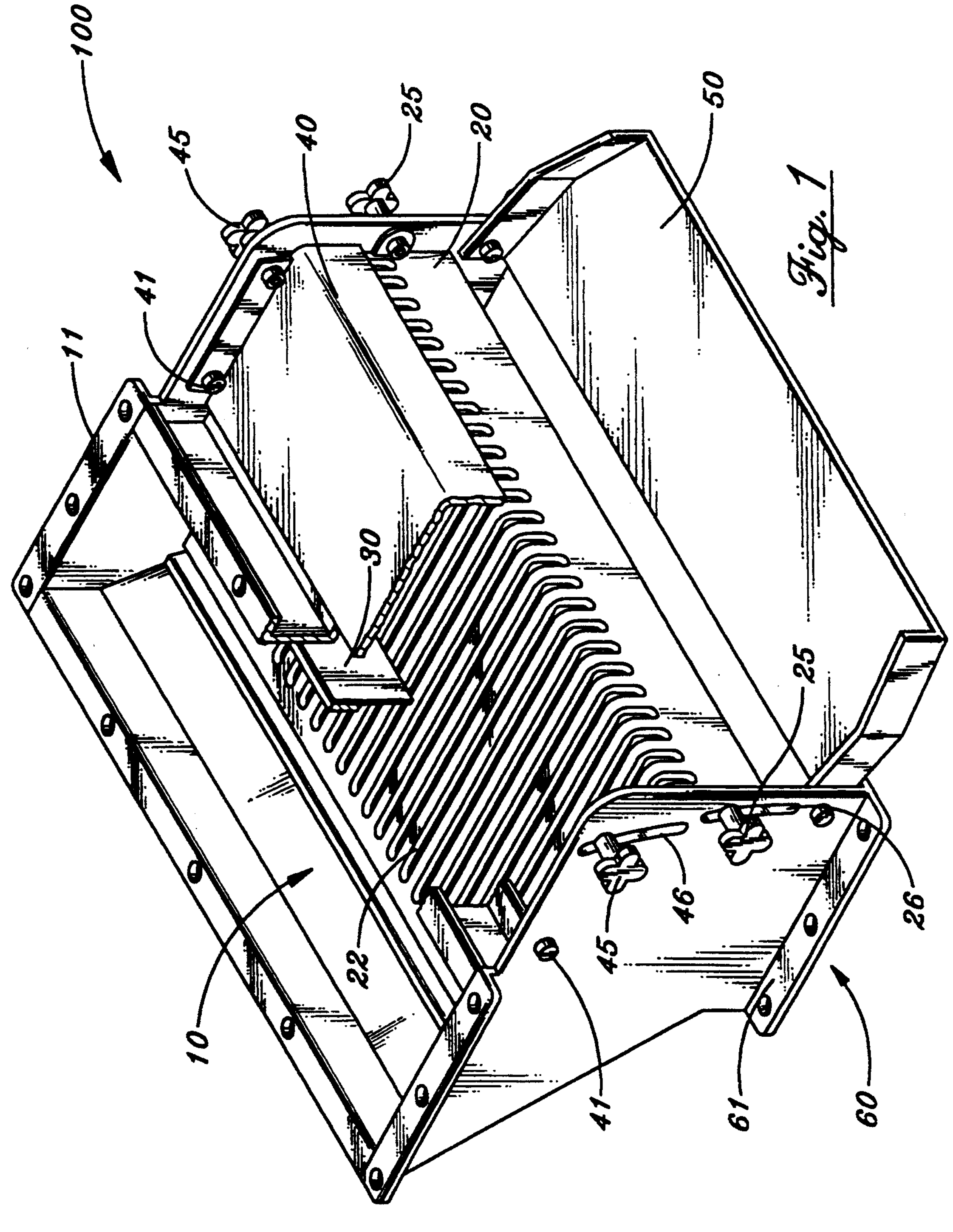
FIG. 1 is a cutaway perspective view of the present invention.
Figure 2:
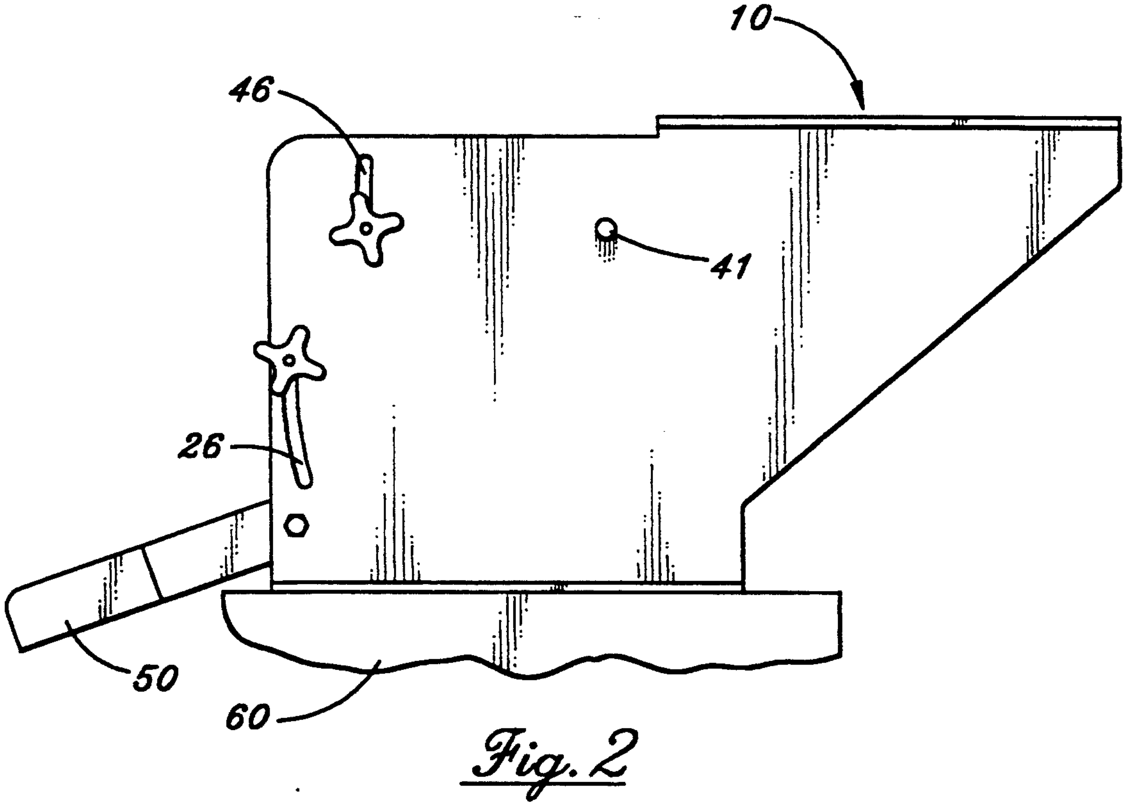
FIG. 2 is a side elevation view showing further details of the invention.

Important features of the invention can best be illustrated by referring to FIGS. 1 and 2. Scalper 100 has a housing with a top feed inlet 10 with an inlet flange 11 for connecting the scalper to a feed bin (not shown), a bottom discharge 60 with a discharge flange 61 for connecting the scalper to the feeder inlet hopper of a roll grinder (also not shown), and a sidewardly disposed trash chute 50 for discharging coarse trash material for disposal.

Figure 3:
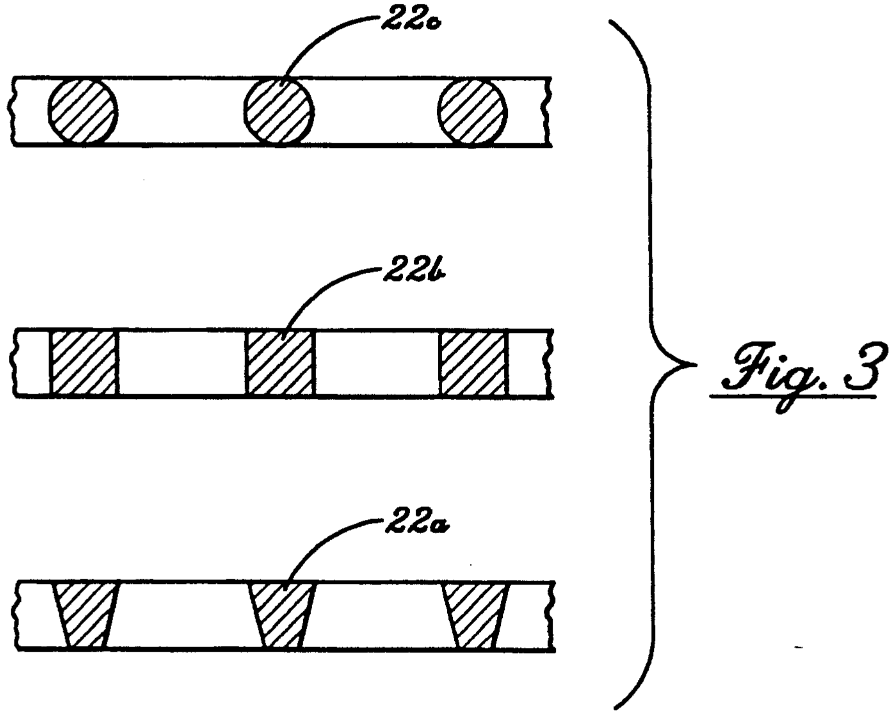
FIG. 3 is an end view showing three possible configurations of grate bars.

At the bottom of feed inlet 10, a grate 20 is positioned and is adjustably inclined downwardly in the direction of trash discharge chute 50. Grate bars 22 are parallel in the direction of inclination and are spaced appropriately for the feed material being processed. The angle of inclination of grate 20 is adjustable by means of grate adjustment knobs 25 fastened to studs extending from the discharge end of grate 20 through grate adjustment slots 26 in the end walls of scalper 100. The flat grate 20 is thus adjustable in its inclination from its pivotal attachment at the rear edge of feed inlet 10 to its free end which is clamped at the desired height in grate adjustment slots 26 by adjustment knobs 25 above the rear edge of trash discharge chute 50. Disposed above grate 20 from a point near the forward edge of feed inlet 10, is an adjustable door 40 which is spaced from grate 20 a sufficient distance to permit passage of trash material over the grate to trash discharge chute 50. Door 40 is suspended from pivots 41 and is adjustable, in a similar manner to that of grate 20, by release of door adjustment knobs 45 which are threaded on adjustment studs extending through door adjustment slots 46 in the end walls of scalper 100. Door 40 enables regulation of flow along the grate bars 22 to provide efficient trash removal at practical operating rates. Finally, a flow director 30 which is a squeegee-like device having a soft and flexible lower portion is disposed in close proximity to the top of grate 20 at the forward edge of feed inlet 10. This serves to level and distribute the flow of feed material over the full length of grate 20 to use the capacity of the grate to its full extent. Grate bars 22 are seen in cross-section in FIG. 3 in three alternative embodiments—*22a*, *22b*, and *22c*. Trapezoidal cross-section *22a* is the preferred embodiment, but square *22b* and round *22c* cross-sections may also be used. The trapezoidal cross-section *22a* provides resistance to blockage which may otherwise occur due to wedging action of particles into the spaces between the grate bars 22. Once a particle has passed the narrowest gap at the top surface of the grate, the back-relief provided by the preferred cross-section *22a* of grate bars 22 assures that the particle will not encounter any narrower gap within grate 20 (FIG. 1).

Operation of the present invention starts with introduction of feed material into feed inlet 10 from a feed bin mounted above. The feed material lands on top of grate 20, and a significant fraction thereof immediately passes through the gaps between bars 22. Coarse trash material such as plant stalks, corn cobs, leaves, coarse metal, and stones remains on top of grate 20 and tends to slide downwardly along the incline toward the trash discharge chute 50. Feed material which passes through grate 20 is dropped through discharge 60 into the feed bin of a roll grinder mounted below scalper 100.

Coarse trash material and the remaining fraction of feed material retained on grate 20 encounters flow director 30, which tends to level and distribute feed material and coarse trash material as it passes thereunder. This improves capacity and efficiency by using more of the grate surface and also by reducing the likelihood of masking or blocking of the grate by coarse trash material. Door 40 is adjusted to permit passage, along the top of grate 20, of the coarsest trash material expected but to provide sufficient drag to control the flow rate of material through scalper 100.

What is claimed is:

1. A scalper for removing trash from feed material prior to entry of said feed material into a roll mill grinder, comprising:

a scalper housing having a top feed material inlet, a bottom product discharge outlet, and a trash discharge chute;

a grate located within said housing below said feed material inlet and inclined downwardly therefrom above said discharge outlet toward said trash discharge chute, said grate comprising parallel uniformly spaced grate bars extending from said inlet toward said trash discharge chute;

means for adjusting the downward incline of said grate rigid door means, situated above said grate, for controlling flow of coarse trash along said grate bars toward said trash discharge chute; and means for adjusting said rigid door means for defining a gap between door means and said grate.

2. The apparatus of claim 1, further comprising:

flow director means for distributing feed material across the full width of said grate, said flow director means comprising a flexible apron suspended from the inlet and having its lower edge in close proximity to said grate.

3. The apparatus of claim 1, wherein the outlet is offset, from the feed material inlet, in the direction of the trash discharge chute.

4. The apparatus of claim 1, wherein said grate bars comprise rods having a trapezoidal cross section such that the space between said bars also has a trapezoidal cross section with the larger space at the bottom of said grate bars.

* * * * *